United States Patent
Miyamori

(10) Patent No.: US 10,944,884 B2
(45) Date of Patent: Mar. 9, 2021

(54) IMAGING DEVICE AND NON-TRANSITORY COMPUTER READABLE MEDIUM STORING PROGRAM

(71) Applicant: FUJI XEROX CO., LTD., Tokyo (JP)

(72) Inventor: Shinya Miyamori, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 79 days.

(21) Appl. No.: 16/292,343

(22) Filed: Mar. 5, 2019

(65) Prior Publication Data

US 2020/0099820 A1    Mar. 26, 2020

(30) Foreign Application Priority Data

Sep. 21, 2018  (JP) ................... 2018-177720

(51) Int. Cl.
    *H04N 1/387*    (2006.01)
    *G06T 3/40*     (2006.01)
    *H04N 1/00*     (2006.01)

(52) U.S. Cl.
    CPC ......... *H04N 1/3878* (2013.01); *G06T 3/4015* (2013.01); *G06T 3/4038* (2013.01); *H04N 1/00785* (2013.01)

(58) Field of Classification Search
    CPC .................... H04N 1/3878; H04N 1/00785
    See application file for complete search history.

(56) References Cited

U.S. PATENT DOCUMENTS

| 2005/0211874 A1* | 9/2005 | Takeyama | G02B 21/16 250/208.1 |
| 2013/0202204 A1* | 8/2013 | Yamanaka | G06T 5/003 382/167 |
| 2017/0187917 A1* | 6/2017 | Tanaka | H04N 1/00737 |

FOREIGN PATENT DOCUMENTS

JP        5602925        10/2014

* cited by examiner

*Primary Examiner* — Tuan H Nguyen
(74) *Attorney, Agent, or Firm* — JCIPRNET

(57) ABSTRACT

An imaging device includes: an imaging unit that divides an object to be imaged into multiple areas, and captures multiple divided images; a correcting unit that corrects the multiple divided images captured by the imaging unit; and a generating unit that generates one composite image by compositing the multiple divided images after being corrected by the correcting unit.

10 Claims, 14 Drawing Sheets

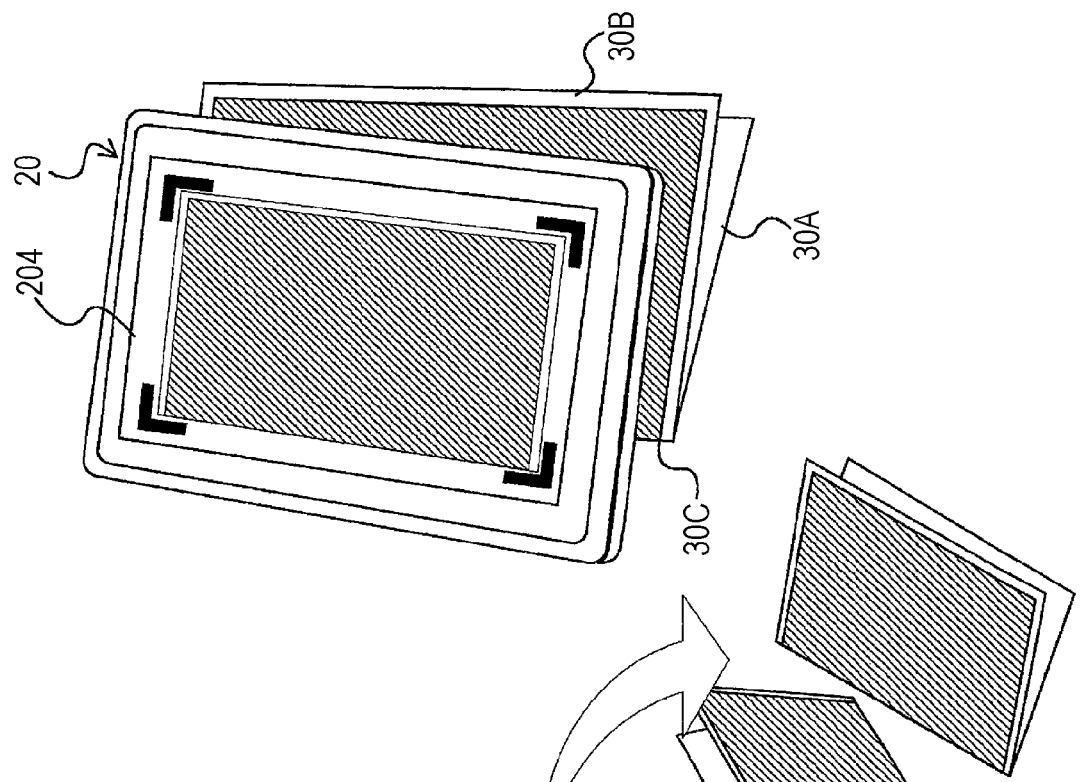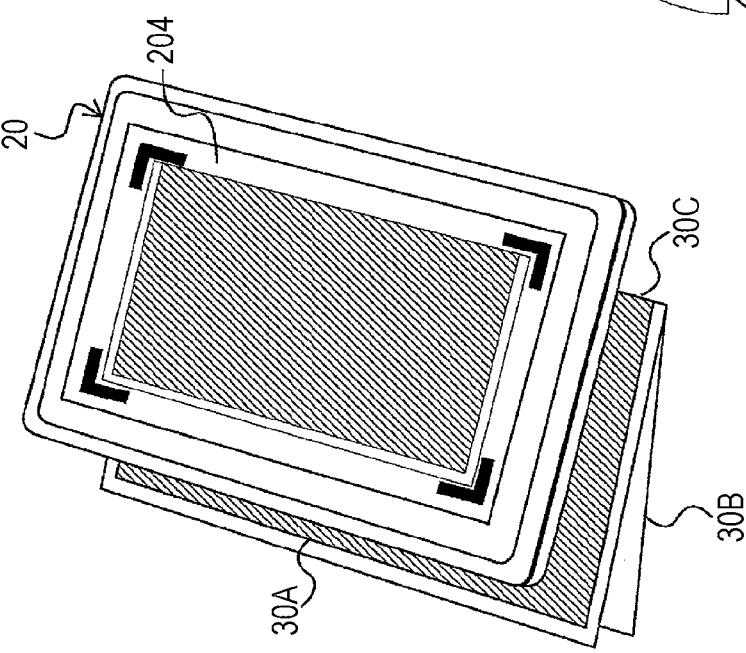

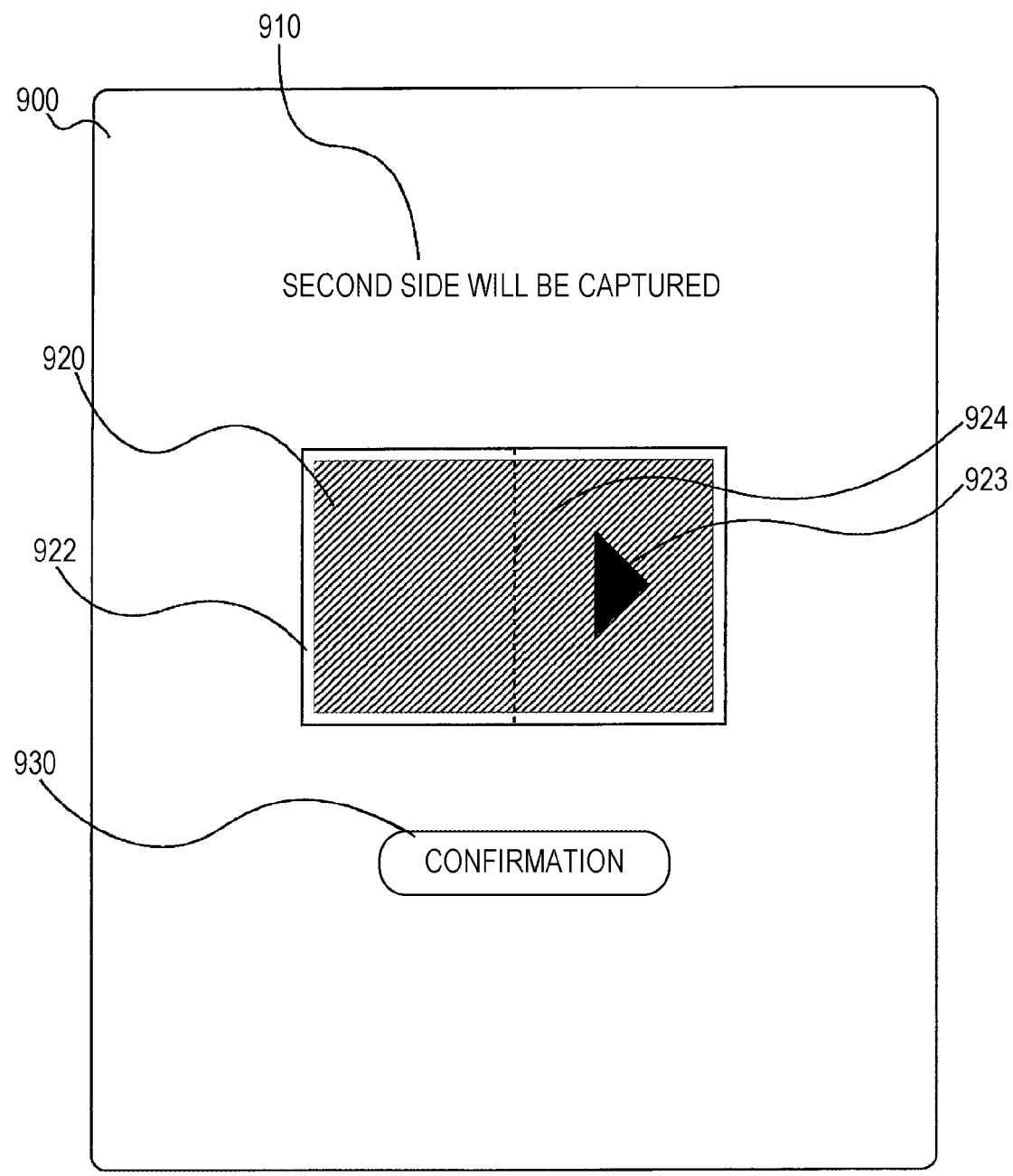

IMAGING DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-177720 filed Sep. 21, 2018.

BACKGROUND

(i) Technical Field

The present disclosure relates to an imaging device and a non-transitory computer readable medium storing a program.

(ii) Related Art

Japanese Patent No. 5602925 discloses an imaging technology in which a symbol for positioning including symbol codes of multi-valued figures is provided at least two predetermined positions of an object to be imaged, the object to be imaged is captured by an imaging unit, each symbol for positioning is detected from the original image captured, and image correction (trapezoidal correction) is made with reference to the symbol for positioning, thereby enhancing the reproducibility of a document.

SUMMARY

Aspects of non-limiting embodiments of the present disclosure relate to an imaging device and a non-transitory computer readable medium storing a program that are capable of obtaining more accurate image data, as compared with when an object to be imaged is captured only once.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an imaging device including: an imaging unit that divides an object to be imaged into a plurality of areas, and captures a plurality of divided images; a correcting unit that corrects the plurality of divided images captured by the imaging unit; and a generating unit that generates one composite image by compositing the plurality of divided images after being corrected by the correcting unit.

BRIEF DESCRIPTION OF THE DRAWINGS

Exemplary embodiments of the present disclosure will be described in detail based on the following figures, wherein:

FIG. 2A is an explanatory diagram when the object to be imaged is folded in half along a central line, and the first side is imaged, FIG. 2B is an explanatory diagram illustrating the manner in which the object to be imaged is flipped over with folded in half, and FIG. 2C is an explanatory diagram when the object to be imaged is imaged with the second side up;

FIG. 9 illustrates an example of an imaging instruction display screen that displays instructions for imaging the second side of the object to be imaged;

DETAILED DESCRIPTION

Figure 1A:
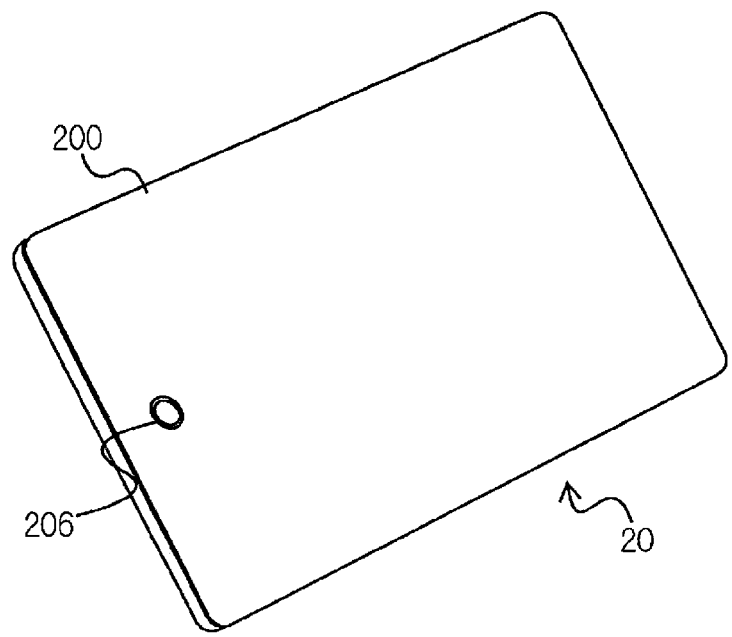
FIG. 1A is an external perspective view illustrating an example of an imaging device in an exemplary embodiment.
Figure 1B:
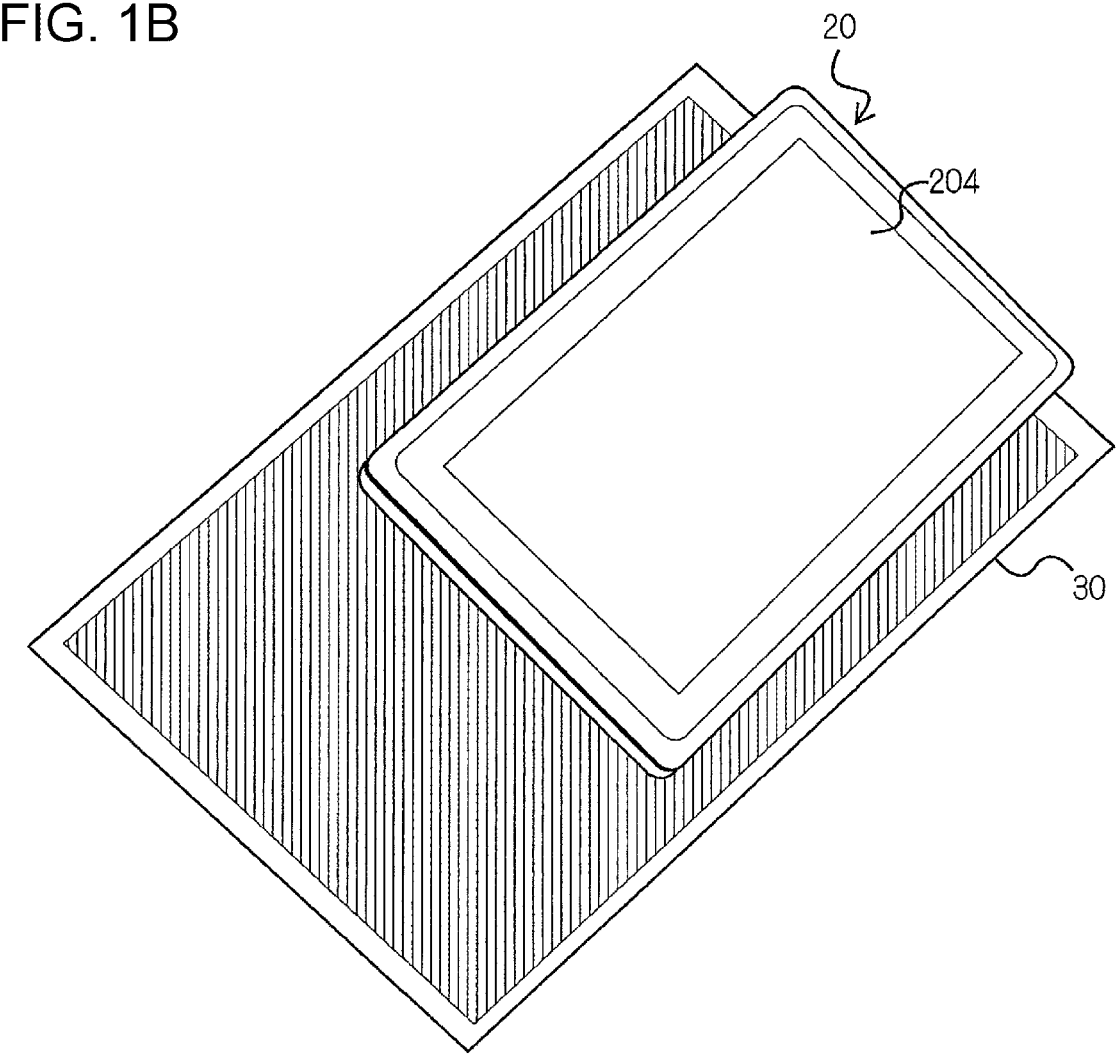
FIG. 1B is a perspective view when an object to be imaged is imaged using the imaging device.

An imaging device 20 in an exemplary embodiment of the present disclosure will be described with reference to FIGS. 1A and 1B. FIG. 1A is an external perspective view illustrating an example of the imaging device 20 in the exemplary embodiment, and FIG. 1B is a perspective view when an object to be imaged 30 is imaged using the imaging device 20. As illustrated in FIGS. 1A and 1B, the imaging device 20 in the exemplary embodiment is, for instance, a tablet computer. However, without being limited to this, as long as the imaging device 20 has the configuration described below, the imaging device 20 may be a smartphone and a digital camera, or may be another terminal apparatus such as a notebook computer including a camera device. A camera 206 is provided on the back surface of a housing 200 of the imaging device 20. In addition, a display 204 is provided on the surface of the housing 200 of the imaging device 20 so as to occupy the most of the surface.

Although described later, when the object to be imaged 30 is imaged, the image of the object to be imaged 30 captured by the camera 206 is displayed on the display 204 in real time, a user is able to capture the object to be imaged 30 by operating an input interface (described later) disposed on the display 204 while visually recognizing the object to be imaged 30 displayed on the display 204.

In the exemplary embodiment, the object to be imaged 30 is a test image outputted by an image forming apparatus, such as a printer and a multifunction machine. The test image is a color-filled image or an entire surface halftone image in which the entire sheet surface other than the margins is printed with, for instance, one of black, cyan, magenta, and yellow or a color mixing a combination thereof at a certain concentration. The test image provides an image which allows a user to identify the presence of unevenness or the presence of banding particularly when image data with a certain gradation value is printed and outputted. Needless to say, the object to be imaged in the present disclosure is not limited to this example, and may be other images.

When the object to be imaged 30 as described above is imaged by the imaging device 20, the object to be imaged 30 is relatively large in some cases. For instance, when the object to be imaged 30 has a large sheet size such as "A3" size, the camera 206 of the imaging device 20 has to be away from the object to be imaged 30 by a certain distance to capture the entire object to be imaged 30 by the imaging device 20 with a single shot, thus it is not possible to obtain a highly accurate image. When a highly accurate image is not available, it is difficult to identify the presence of unevenness or the presence of banding when image data with a certain gradation value is printed and outputted, thus it is better to capture a highly accurate image as much as possible.

Thus, in the imaging device 20 of the exemplary embodiment, the object to be imaged 30 is divided into multiple areas, imaged, and corrected, then one highly accurate composite image is generated by compositing multiple divided areas after correction. For instance, as illustrated in FIG. 2A, the object to be imaged 30 is folded in half along a central line 30C, and a first side 30A is imaged. Next, as illustrated in FIG. 2B, the object to be imaged 30 is flipped over with folded in half, and as illustrated in FIG. 2C, a second side 30B is imaged with the second side 30B up. In the imaging device 20, divided images obtained by imaging the first side 30A and divided images obtained by imaging the second side 30B are corrected, and one composite image is generated.

Figure 3:
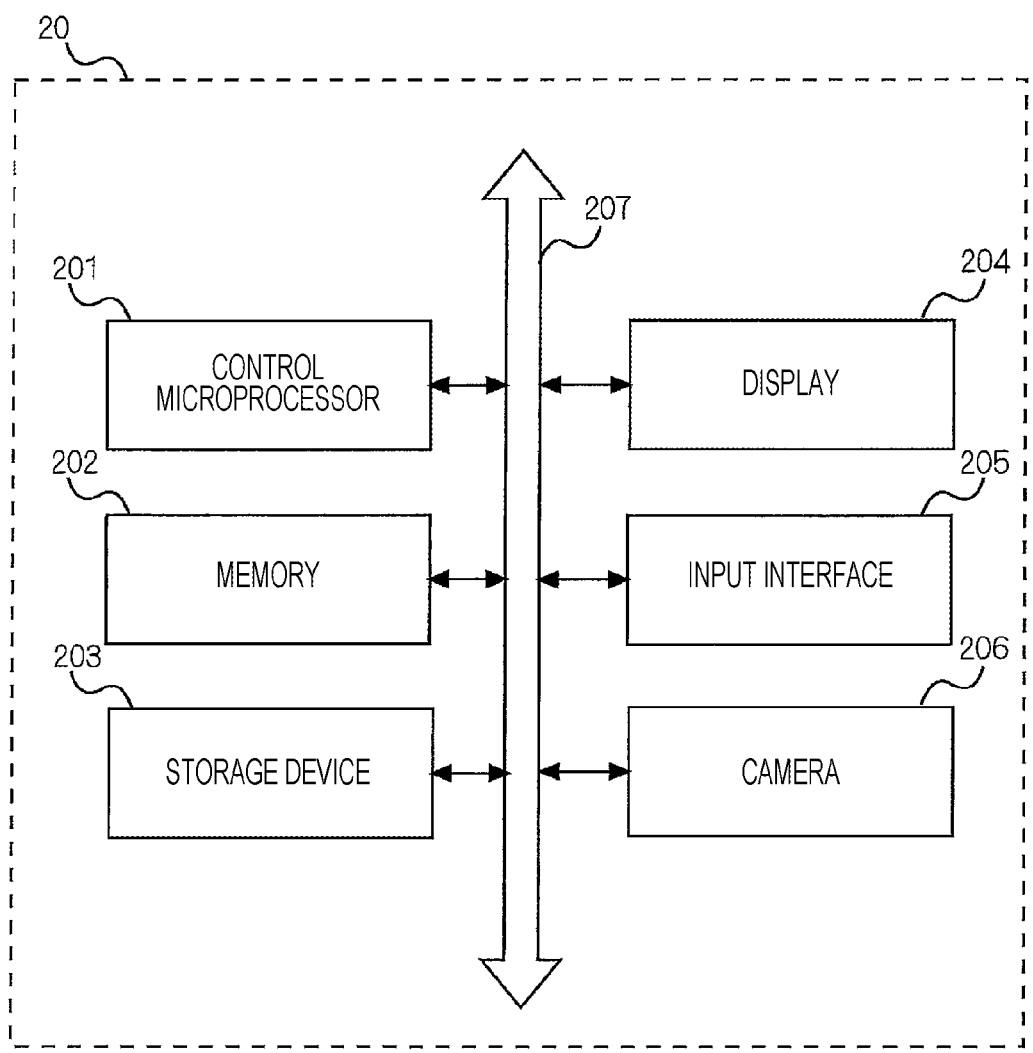
FIG. 3 is a diagram illustrating the hardware configuration of the imaging device in the exemplary embodiment.

The configuration of the imaging device 20 in the exemplary embodiment will be described with reference to FIG. 3. FIG. 3 is a diagram illustrating the hardware configuration of the imaging device 20 in the exemplary embodiment.

As illustrated in FIG. 3, the imaging device 20 has a control microprocessor 201, a memory 202, a storage device 203, a display 204, an input interface 205, and a camera 206. These components are connected to a control bus 207.

The control microprocessor 201 controls the operation of each component of the imaging device 20 based on a control program stored in the storage device 203.

The memory 202 stores an image of the object to be imaged 30 captured by the camera 206, sheet information of an object to be imaged obtained by the later-described sheet information obtaining unit, an image corrected by an image corrector, and a composite image generated by an image generator.

The storage device 203 is configured by a solid state drive (SDD) and/or a hard disk (HDD), and stores a control program for controlling each unit of the imaging device 20.

The display 204 is a liquid crystal display or an organic EL display provided on the surface of the housing 200 of the imaging device 20, and displays information generated by the later-described display controller.

The input interface 205 is a transparent touch panel stacked and disposed on the surface of the display 204, and is an input unit for a user operating the imaging device 20 to input instructions.

The camera 206 is provided on the back surface of the housing 200 of the imaging device 20, the image of the object to be imaged 30 is divided and captured by instructions of the later-described camera controller or instructions inputted by a user who operates the input interface 205, and the captured image is stored in the memory 202.

Figure 4:
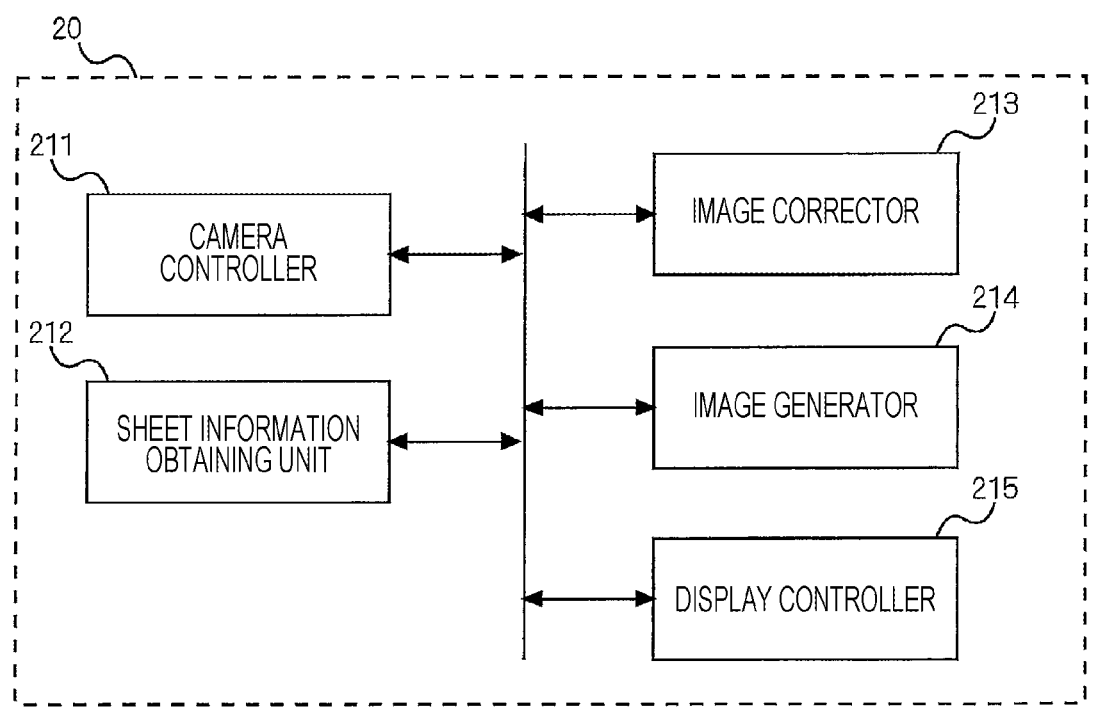
FIG. 4 is a diagram illustrating the functional block of the imaging device of FIG. 3.

Next, the function of the imaging device 20 in the exemplary embodiment will be described with reference to FIG. 4. FIG. 4 is a diagram illustrating the functional block of the imaging device 20 of FIG. 3. As illustrated in FIG. 4, the imaging device 20 implements the functions of a camera controller 211, a sheet information obtaining unit 212, an image corrector 213, an image generator 214, and a display controller 215 by the control microprocessor 201 executing the control program stored in the storage device 203.

The camera controller 211 controls the operation of the camera 206. When the object to be imaged 30 meets a predetermined condition in an image captured by the camera 206, for instance, when target positions and the positions of the four corners of a target area to be imaged displayed on the display 204 match within a predetermined range in the image displayed on the display 204, the camera controller 211 focuses the object to be imaged 30, captures the target area to be imaged, and the captured image is stored in the memory 202. In this process, the camera controller 211 captures the object to be imaged 30 as multiple division images divided into multiple areas.

The sheet information obtaining unit 212 obtains sheet information of an object to be imaged. In general, the periphery of the object to be imaged is provided with a margin, and the sheet information includes a sheet size, a margin, and the number of divisions of the object to be imaged. Although an object to be imaged is printed on a sheet in the exemplary embodiment, the sheet which is the object to be imaged in the present disclosure is not limited to paper. Any object, like a print medium such as a plastic sheet and cloth, may be used as long as the object allows to be printed or has something printed on the object. The sheet information obtaining unit 212 instructs the display controller 215 to display a user interface which prompts a user to input sheet information, and sheet information inputted by the user via the input interface 205 is stored in the memory 202.

The image corrector 213 corrects multiple divided images captured by the camera 206. Specifically, the image corrector 213 corrects each of the multiple divided images to target size and shape. Alternatively, the image corrector 213 corrects the size, distortion, and inclination of each of the multiple divided images. At this point, the image corrector 213 corrects the multiple divided images using the sheet information of the object to be imaged obtained by the sheet information obtaining unit 212.

When the object to be imaged 30 is captured by the camera 206 of the imaging device 20, in many cases, the object to be imaged 30 is obliquely captured little, or each time of capture, the distance from the object to be imaged 30 varies, and therefore the size of captured object varies. Thus, distortion of the captured image is removed by performing projection conversion thereon, and the size of the image is adjusted. In this process, the image corrector 213 corrects a portion, other than the margin, of each of the divided images to size and shape which are obtained by dividing the sheet size included in the sheet information obtained by the sheet information obtaining unit 212 by the set number of divisions and subtracting a margin from the quotient. At the time of correction, the image corrector 213 performs correction of adding a solid color image corresponding to the margin included in the sheet information in the periphery of the corrected image other than the margin, in other words, the portion where the margin should be present.

In order to identify the portion of each divided image other than the margin and to detect the boundaries between the multiple areas, the image corrector 213 performs edge detection on each divided image. Specifically, the image corrector 213 detects edges of each divided image in a longitudinal direction and a traverse direction, thereby identifying the vertices of a printing area from the points of intersection.

The image generator 214 generates one composite image in which multiple divided images corrected by the image corrector 213 are composited by connecting the boundaries detected by the image corrector 213.

The display controller 215 generates and processes an image displayed on the display 204. When an object to be imaged is imaged by the camera 206, the display controller 215 performs control to display an image captured by the camera 206 on the display 204, an image generated by the image generator 214 on the display 204, and/or an user interface (UI) which prompts a user to input various instructions including input of sheet information. In addition, the display controller 215 displays an image of the object to be imaged 30 on the display 204 in real time, and displays the target positions of the four corners of a target area to be imaged of the object to be imaged 30 on the display 204.

Figure 5:
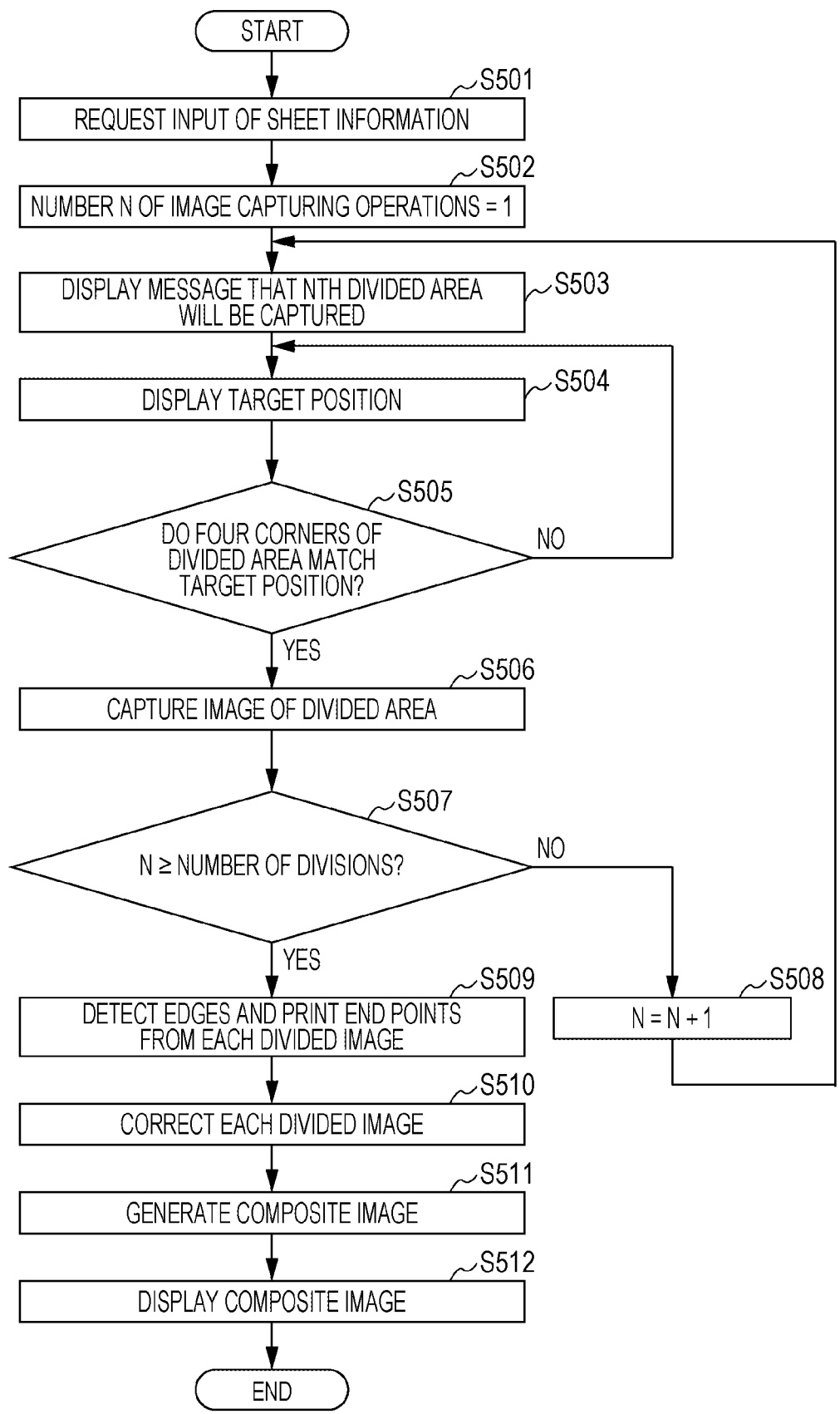
FIG. 5 is a flowchart illustrating the flow of image composing processing in the imaging device in the exemplary embodiment.

Next, the flow of processing performed by the imaging device 20 in the exemplary embodiment will be described with reference to FIGS. 5 to 9. FIG. 5 is a flowchart illustrating the flow of image composing processing in the imaging device 20 in the exemplary embodiment. Although the case will be described where the object to be imaged 30 is an A3 sheet in the following description, the present disclosure is not limited to the case where the object to be imaged 30 is an A3 sheet, and is also applicable to the case where the object to be imaged 30 has another sheet size.

Figure 6:
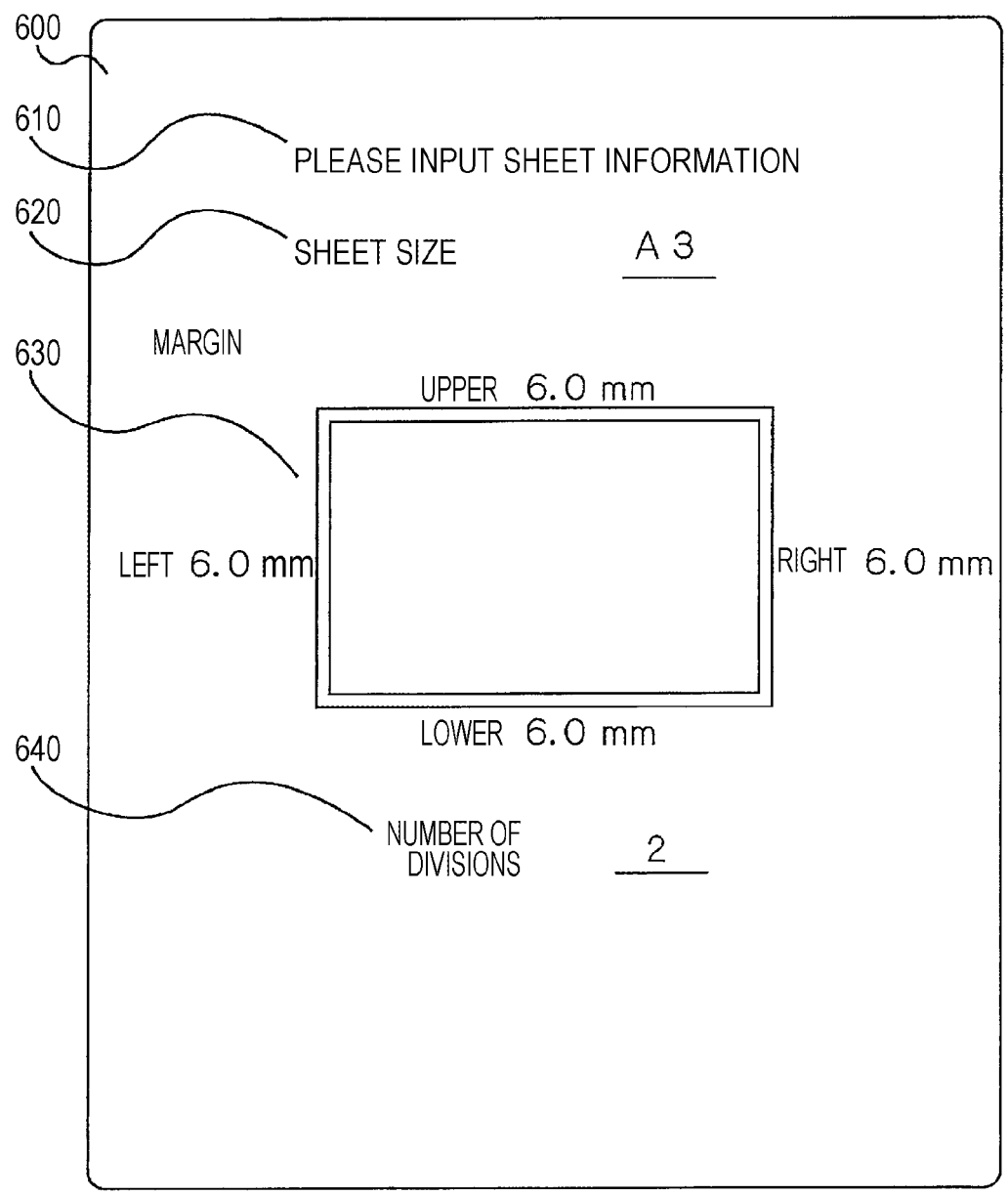
FIG. 6 is a diagram illustrating an example of a sheet information input screen displayed on a display.

In step S501 of FIG. 5, the sheet information obtaining unit 212 instructs the display controller 215 to display a user interface that prompts a user to input sheet information. The display controller 215 generates a sheet information input screen 600 as illustrated in FIG. 6, and displays the sheet information input screen 600 on the display 204. FIG. 6 is a diagram illustrating an example of the sheet information input screen 600 displayed on the display 204.

As illustrated in FIG. 6, the sheet information input screen 600 includes an input request message 610 such as "please input sheet information", a sheet size input field 620, a margin information input field 630, and a number of divisions input field 640. FIG. 6 illustrates an example in which sheet size "A3" is inputted in the sheet size input field 620, "6.0 mm" is inputted as "upper margin", "lower margin", "left margin", and "right margin" in the margin information input field 630, and "2" is further inputted in the number of divisions input field 640. The sheet information obtaining unit 212 stores these pieces of sheet information, which have been inputted by a user operating the input interface 205, in the memory 202.

In step S502, the camera controller 211 sets variable N to 1, the variable N representing the number of image capturing operations.

Figure 7:
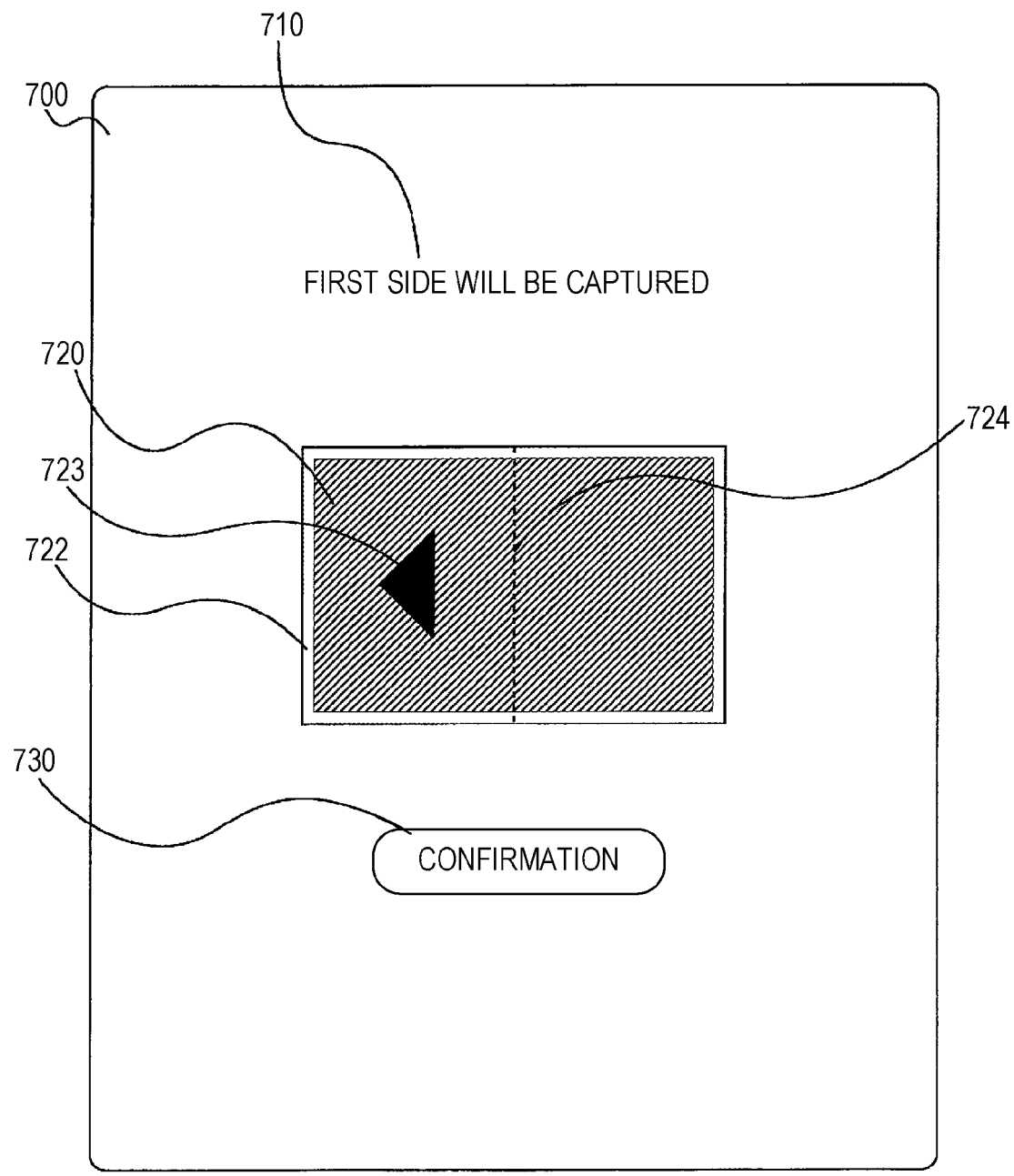
FIG. 7 illustrates an example of an imaging instruction display screen that displays instructions for imaging the first side of the object to be imaged.

In step S503, the display controller 215 displays a message on the display 204, the message indicating that the Nth side, in other words, the Nth divided area will be imaged. When the number N of image capturing operations is one, the display controller 215 displays a message on the display 204, the message indicating that the first side, in other words, the first divided area will be imaged. FIG. 7 illustrates an example of an imaging instruction display screen 700 that displays instructions for imaging the first side of the object to be imaged 30. As illustrated in FIG. 7, the imaging instruction display screen 700 includes an explanatory text 710 such as "the first side will be imaged", a simplified diagram 720 indicating which area of the overall sheet that is the object to be imaged 30 is imaged, and a "confirmation" button 730.

Figure 8:
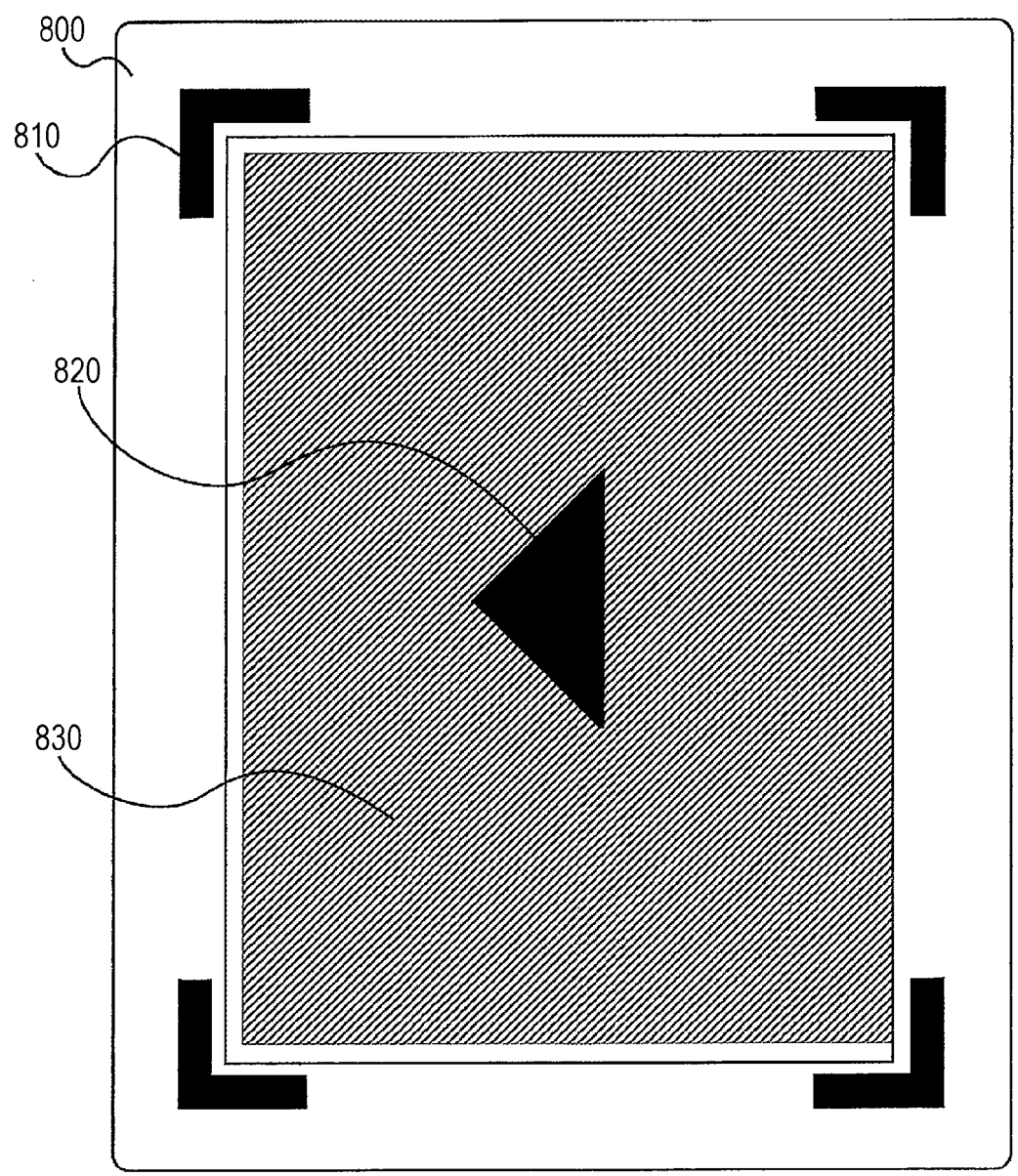
FIG. 8 illustrates an example of an imaging screen at the time of imaging divided area of the object to be imaged.

The simplified diagram 720 includes a sheet outline 721 indicating the overall sheet that is the object to be imaged 30 in a simplified manner, a margin 722, a direction display mark 723 indicating the direction of the sheet, and a division line 724. In FIG. 8, the direction display mark 723 is a triangular mark facing toward the left side of FIG. 8, and indicates that the left side of the sheet with the left end of the sheet in the traverse direction on the left side and the division line 724 at the center is imaged the first time. A user refers to the simplified diagram 720, mountain-folds the sheet that is the object to be imaged 30 along the division line 724 (the central line 30C of the sheet, which is not actually printed), places the sheet on a desk or the like with the left end of the sheet facing toward the left side, and selects the "confirmation" button 730.

Subsequently, the flow proceeds to step S504 of FIG. 5, the camera controller 211 starts the camera 206, and the display controller 215 displays an image including the object to be imaged 30 captured by the camera 206 on the display 204 in real time. Simultaneously, the display controller 215 displays on the display 204 the target positions of the four corners of a target area to be imaged of the object to be imaged 30. FIG. 8 illustrates an example of an imaging screen 800 at the time of imaging divided area of the object to be imaged 30. As illustrated in FIG. 8, the imaging screen 800 displays auxiliary marks 810 that indicate the target positions of the four corners, a direction display mark 820 indicating the direction of the sheet that is the object to be imaged 30, and an image 830 of the object to be imaged 30 captured by the camera 206.

In step S505 of FIG. 5, the camera controller 211 determines whether the object to be imaged 30 in an image captured by the camera 206 meets a predetermined condition, for instance, whether the auxiliary marks 810 displayed on the display 204 match the positions of the four corners of a target area to be imaged within a predetermined range in the image displayed on the display 204. When it is determined that the condition is not met, the flow returns to step S504, an image of the object to be imaged 30 is continued to be captured by the camera 206 and the image is displayed on the display 204. When it is determined that the condition is met, the flow proceeds to step S506.

In step S506, the camera controller 211 focuses the object to be imaged 30 with the camera 206, captures the Nth divided area, and stores a captured divided image in the memory 202.

In step S507, the camera controller 211 determines whether the number N of image capturing operations is the number of divisions (the number N of image capturing operations=the number of divisions) of the sheet that is the object to be imaged 30. When the number N of image capturing operations is not equal to the number of divisions, or when the number N is less than the number of divisions, in step S508, the camera controller 211 sets N=N+1, and the flow returns to step S503. For instance, when the number of divisions of the object to be imaged 30 is "2" and the number N of image capturing operations is "1", in other words, when only the first divided area has been captured, the number N is less than the number of divisions, thus the flow returns to step S503, and the camera controller 211 performs the processing in step S503 to step S507 on the second divided area of the object to be imaged 30.

At the time of the second imaging processing, in step S503, the display controller 215 displays a message on the display 204, the message indicating that the second side, in other words, the second divided area will be imaged. FIG. 9 illustrates an example of an imaging instruction display screen 900 that displays instructions for imaging the second side of the object to be imaged 30. As illustrated in FIG. 9, the imaging instruction display screen 900 includes an explanatory text 910 such as "the second side will be imaged", a simplified diagram 920 indicating which area of the overall sheet that is the object to be imaged 30 is imaged, and a "confirmation" button 930.

In contrast to the case of FIG. 7, a direction display mark 923 that indicates the direction of the sheet of the simplified diagram 920 is on the right side of the sheet that is the object to be imaged 30. In addition, the direction display mark 923 faces in the opposite direction, specifically, faces toward the right side of FIG. 7, and indicates that the right side of the sheet with the right end of the sheet in the traverse direction on the right side and the division line 924 at the center is imaged for the second time. A user refers to the simplified diagram 920, flips over the sheet that is the object to be imaged 30 along the division line 924 (the central line 30C of the sheet), places the sheet on a desk or the like with the right end of the sheet facing toward the right side, and selects the "confirmation" button 930.

In step S507 of FIG. 5, when the number N of image capturing operations is equal to the number of divisions, the flow proceeds to step S509. In the exemplary embodiment, for instance, when the number of divisions of the object to be imaged is "2" and the number of image capturing operations already performed is "2", the flow proceeds to step S509.

Figure 10A:
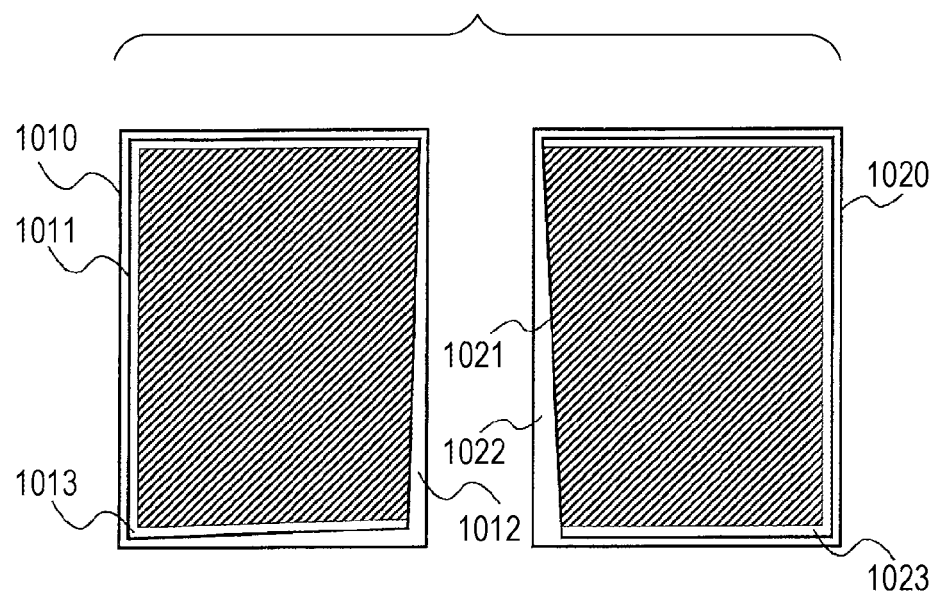
FIG. 10A illustrates imaged divided images.

FIGS. 10A to 10D are each an explanatory diagram illustrating the concept of correction processing performed by the image corrector 213 in step S509, step S510. FIG. 10A illustrates a divided image captured. As illustrated in FIG. 10A, the divided image captured in step S506 described above includes the background image of the periphery of the ends of the sheet in addition to a divided area itself of the object to be imaged 30. FIG. 10A illustrates a first divided image 1010 which has captured the first side of the object to be imaged 30, and a second divided image 1020 which has captured the second side of the object to be imaged 30. The first divided image 1010 and the second divided image 1020 include background images 1012, 1022 of the periphery in addition to an image 1011 itself of the first divided image and an image 1021 itself of the second divided image. In many cases, margins 1013, 1023 included in the background images 1012, 1022, and the image 1011 of the first divided image and the image 1021 of the second divided solid color image.

Figure 10B:
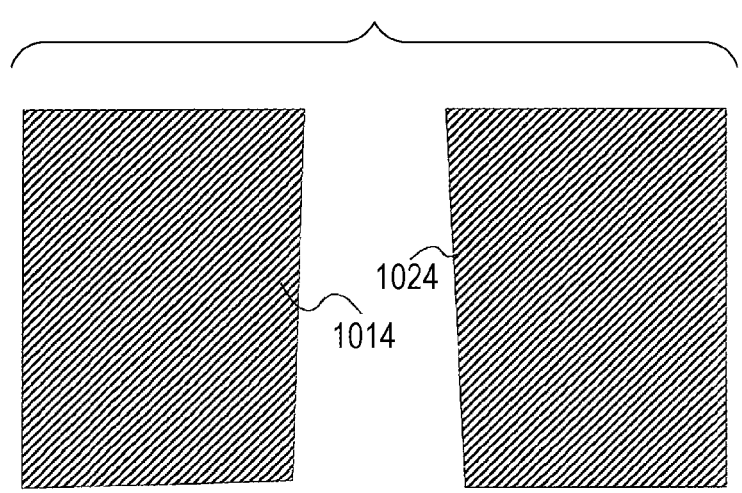
FIG. 10B illustrates a state where only a printed portion is extracted from each divided image of FIG. 10A by edge detection.

Thus, in step S509, the image corrector 213 performs edge detection on each divided image stored in the memory 202, thereby detecting the four printing end points of the each divided image. The edge detection is performed by calculation of differential filter or Hough transformation. Specifically, the edges in a longitudinal direction and a traverse direction are detected, and the points at the corners of a printing area are identified from the points of intersection. As illustrated in FIG. 10B, the image corrector 213 extracts only areas 1014, 1024 not including margin, of the image 1011 of the first divided image and the image 1021 of the second divided image by edge detection. FIG. 10B illustrates a state where only the printed portion is extracted from divided images of FIG. 10A by the edge detection.

Figure 10C:
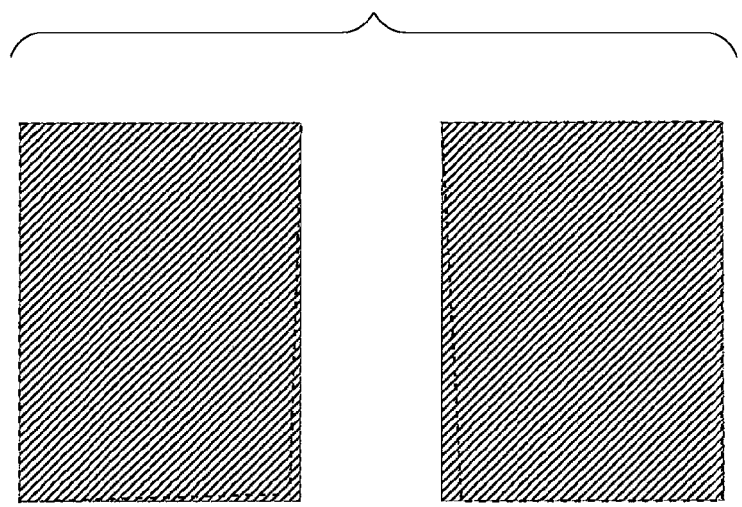
FIG. 10C illustrates a state where the image of the extracted printed portion of FIG. 10B is corrected to the set size and shape.

In step S510, in each divided image, the image corrector 213 performs projection conversion on the image so that four printing ends identified in step S509, that is, the portion other than a margin matches the size and shape obtained by subtracting the portion of the margin from the divided area generated by dividing a sheet size obtained by the sheet information obtaining unit 212 by the number of divisions, then stores the converted image in the memory 202. FIG. 10C illustrates the state then. FIG. 10C illustrates a state where the image of the extracted printed portion of FIG. 10B is corrected to have the set size and shape.

When the sheet size is "A3", the sheet is provided with 6-mm margin in each of the upper, lower, right, and left ends, and the sheet is captured with divided in half as inputted by a user in FIG. 6, correction is made by the image corrector 213 so that the image in the area inward of the printing ends of each divided image has a rectangular shape with the vertical length of "285 mm" (297 mm-12 mm) and the horizontal length of "204 mm" (210 mm-6 mm) which are the sizes excluding the upper margin of "6 mm", the lower margin of "6 mm", and either right or left margin of "6 mm".

Figure 10D:
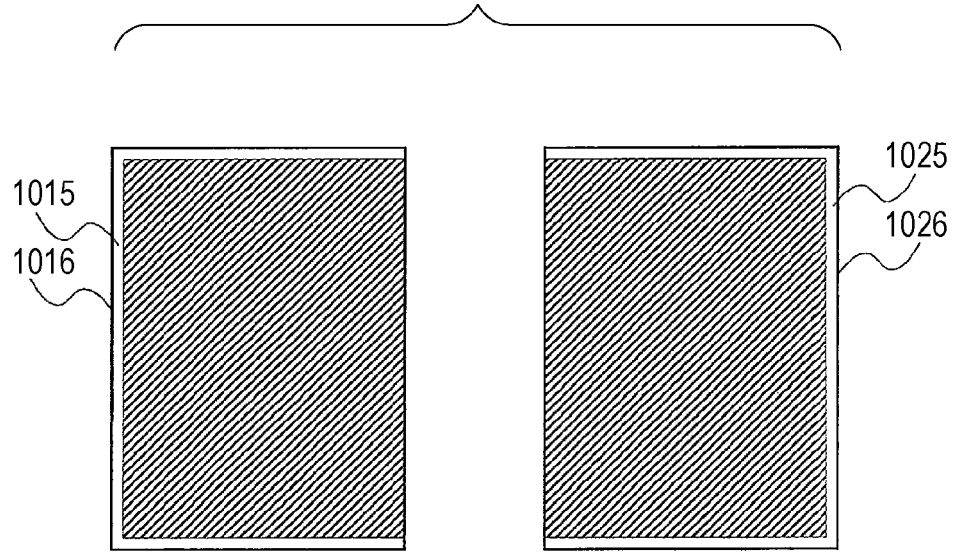
FIG. 10D illustrates a state where a margin set to each image of FIG. 10B is reproduced.

Subsequently, as illustrated in FIG. 10D, the image corrector 213 adds originally provided "6 mm" solid color margins 1015, 1025 to the upper, lower, right, and left sides of the corrected image without a margin to create divided images 1016, 1026 after correction. It is to be noted that FIG. 10D illustrates a state where the margin set to the image of FIG. 10B is restored.

Figure 11:
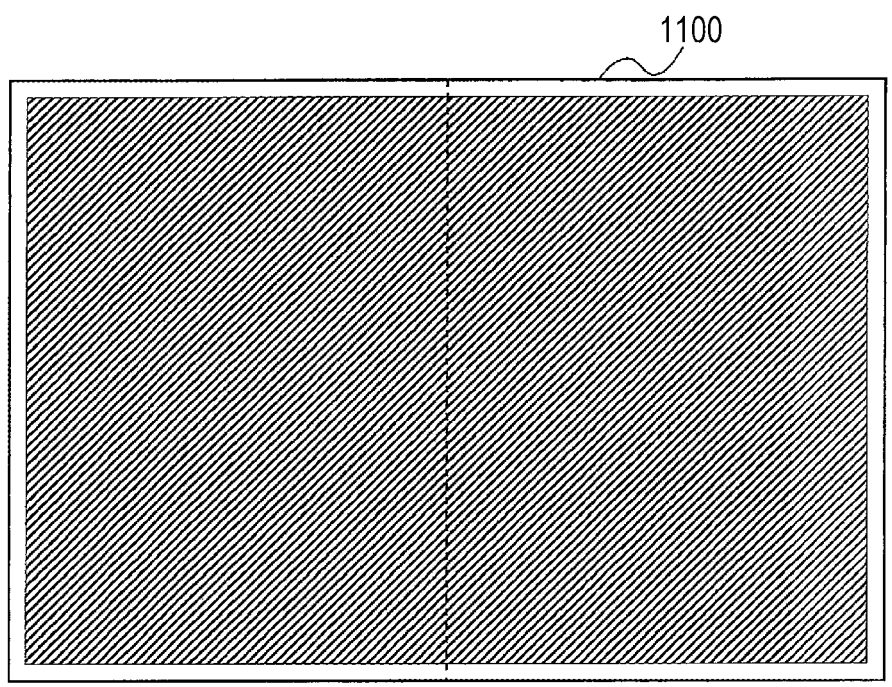
FIG. 11 illustrates a composite image obtained by compositing the corrected divided images in FIGS. 10A to 10D.

Subsequently, in step S511 of FIG. 5, the image generator 214 generates one composite image by combining and compositing multiple post-correction divided images corrected by the image corrector 213 with divided boundary lines, and stores the composite image in the memory 202. The state is illustrated in FIG. 11, and two divided images corrected in FIGS. 10A to 10D are combined along a boundary line in FIG. 11 to generate one composite image 1100.

In step S512 of FIG. 5, the display controller 215 displays the composite image composited in step S511 on the display 204, and completed the processing.

In the above example, the object to be imaged 30 is "A3" sheet, and the case has been described where the object to be imaged 30 is captured in two stages, in other words, the object to be imaged 30 is divided into two division areas and captured, a divided image corresponding to each divided area is corrected, and post-correction divided images are composited to obtain a highly accurate composite image. However, the present disclosure is not limited to the above-described example, and is also effective on the object to be imaged 30 which is a relatively large-sized sheet such as "A2", "A1", "B3", and "B2". The object to be imaged 30 is captured not only in two stages, and may be captured in three or more stages, for instance, in four stages.

In the above example, the case has been described where the object to be imaged 30 is folded in half along the central line 30C to allow the first divided area and the second divided area to be captured separately. However, the present disclosure is not limited to the above example, and multiple divided areas may be captured by another method.

Figure 12A:
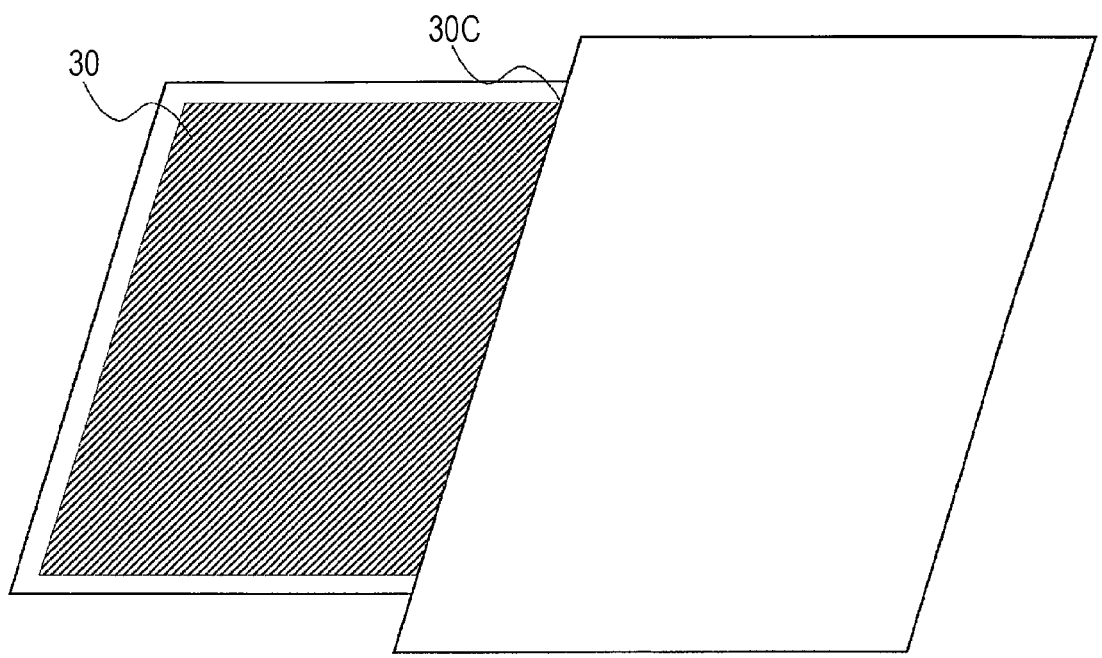
FIG. 12A illustrates a state where one side of the object to be imaged is covered and concealed by shielding paper with a division line as the boundary.

For instance, solid color shielding paper with no printing thereon is placed on the object to be imaged 30 to cover the right side or the left side of the object to be imaged 30 with the central line 30C as a boundary, and the portion of the object to be imaged 30 where the shielding paper is not placed may be separately captured as the first divided area or the second divided area. When the object to be imaged 30 is a filled image as described above, and the shielding paper is a white solid color sheet, at the time of edge detection by the image corrector 213, the edges are identifiable as the printing ends of the divided image (see FIG. 12A).

Figure 12B:
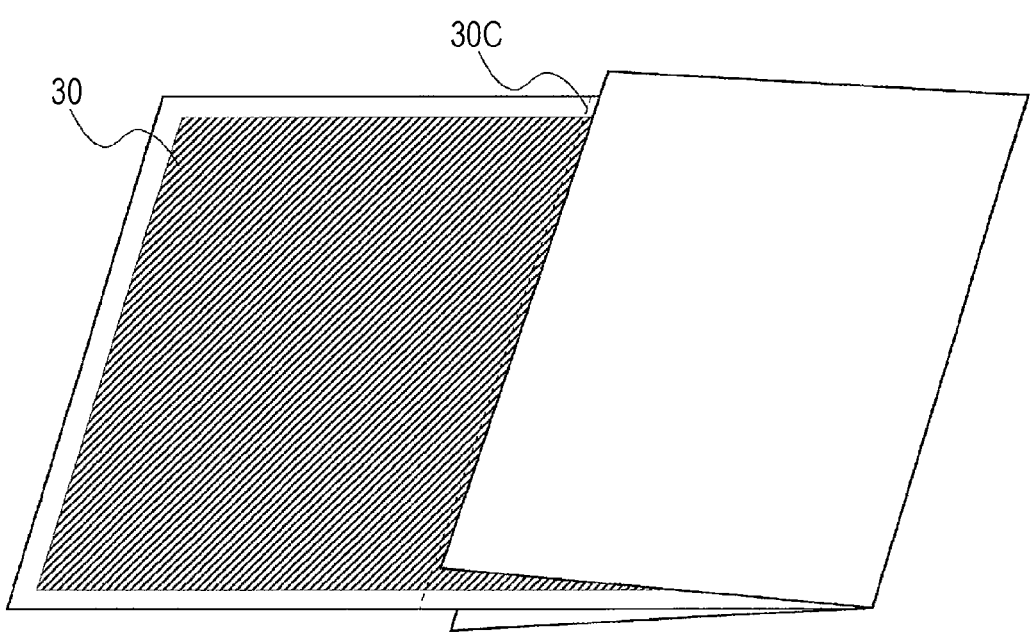
FIG. 12B illustrates a state where a sheet having the same size as the object to be imaged is folded in half to cover the object to be imaged to allow only one of divided areas to be imaged.

Alternatively, when the object to be imaged 30 is an "A4" sheet as described above, the same size "A4" sheet (shielding paper) with no printing thereon is folded in half to cover the half area of the "A4" sheet to be imaged from a sheet end to the central line 30C, and the side which is not covered may be captured as the first divided area. Subsequently, the half area on the opposite side is covered with the shielding paper similarly, and the second divided area may be captured (see FIG. 12B).

Figure 13A:
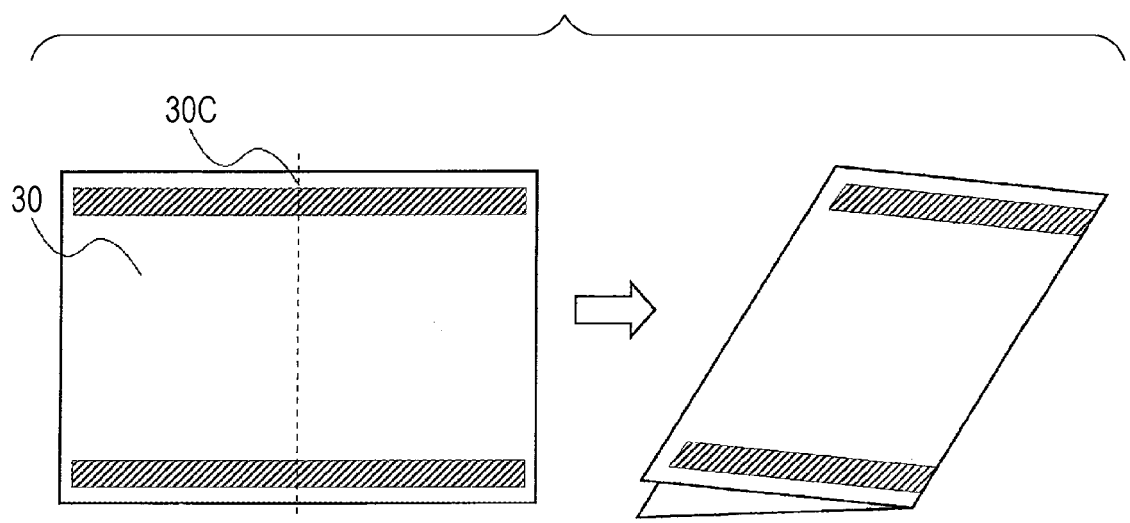
FIG. 13A illustrates a state where a strip print pattern is printed inwardly of the upper and lower margins of the object to be imaged, and only one of divided areas is allowed to be imaged at the time of imaging.

In addition, an example has been described above where the object to be imaged 30 is an image in which the entire paper surface other than the margin is filled with one color. However, the present disclosure is not limited to the above example. For instance, as illustrated in FIG. 13A, a strip-shaped print pattern extending perpendicular to the central line 30C of the paper surface of the object to be imaged 30 may be printed inwardly of the upper and lower margins of the paper surface. In this situation, when the object to be imaged 30 is folded along the central line 30C at the center or when the object to be imaged 30 is covered by solid color shielding paper up to the position of the central line 30C, each strip-shaped print pattern terminates at the central line 30C. Thus, when edge detection is performed by the image corrector 213, the edges are identifiable as the printing ends of the divided image.

Figure 13B:
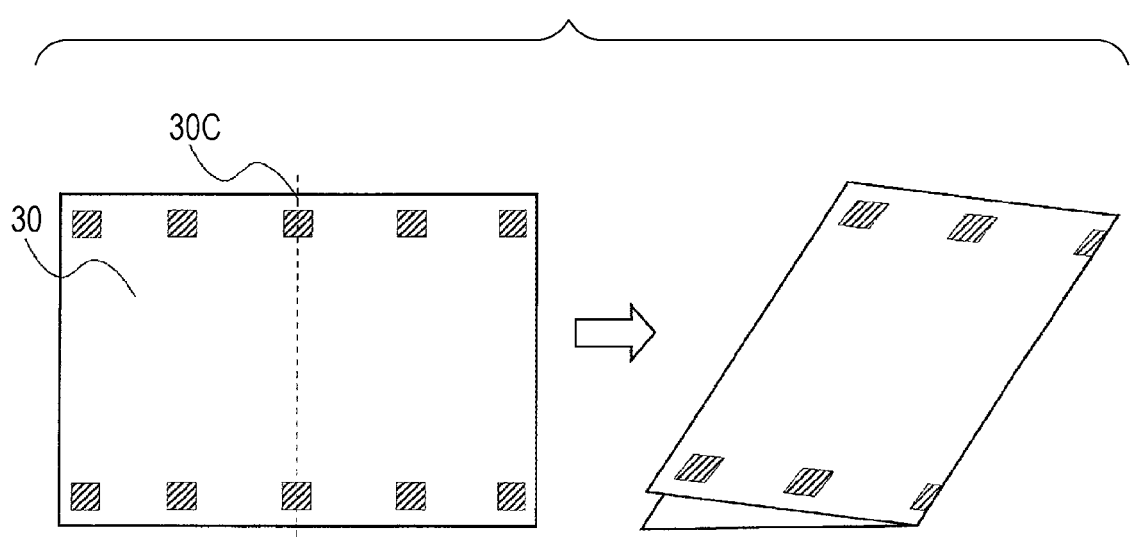
FIG. 13B illustrates a state where a block print pattern is printed inwardly of the upper and lower, margins of the object to be imaged, and only one of divided areas is allowed to be imaged at the time of imaging.

Although an example has been illustrated in FIG. 13A where a strip-shaped print pattern is printed inwardly of the upper and lower margins of the paper surface of the object to be imaged 30, a print pattern other than the strip-shaped print pattern may be printed. For instance, as illustrated in FIG. 13B, multiple block-shaped print patterns extending perpendicular to the central line 30C of the paper surface of the object to be imaged 30 may be arranged inwardly of the upper and lower margins of the paper surface. In this case, the upper and lower print patterns are arranged to overlap with at least part of the central line 30C. In this manner, when the object to be imaged 30 is folded along the central line 30C at the center or when the object to be imaged 30 is covered by solid color shielding paper up to the position of the central line 30C, the upper and lower print patterns terminate at the central line 30C. Thus, when edge detection is performed by the image corrector 213, the edges are identifiable as the printing ends of the divided image.

In the above-described exemplary embodiment which has been described with reference to FIGS. 1A to 13B, the case has been described where capturing of the object to be imaged 30 and composite processing of an image are performed by the single imaging device 20. However, the present disclosure is not limited to the example described above, and capturing of the object to be imaged 30 and display of a composite image after image processing may be performed by the imaging device 20, and the image processing itself may be performed by an image processing server (not illustrated).

In this case, it is sufficient that the imaging device 20 have functions equivalent to those of the camera controller 211, the sheet information obtaining unit 212, and the display controller 215, and the image processing server have functions equivalent to those of the above-described image corrector 213 and image generator 214.

In this case, processing of capturing the object to be imaged 30 in multiple stages corresponding to step S501 to step S508 of FIG. 5 is performed by the imaging device 20. Subsequently, the divided images captured by the imaging device 20 are transmitted to the image processing server, which performs the processing corresponding to step S509 to step S511 of FIG. 5, and generates a composite image. Subsequently, the generated composite image is transmitted from the image processing server to the imaging device 20, which causes the display 204 of the imaging device 20 to display the composite image as in step S512 of FIG. 5. Alternatively, the composite image is transmitted from the image processing server to another terminal apparatus (not illustrated), and a display included in the terminal apparatus may display the composite image.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An imaging device comprising:
    a camera that divides an object to be imaged into a plurality of areas, and captures a plurality of divided images; and
    a processor, configured to:
        obtain sheet information on the object to be imaged, wherein the sheet information comprises a sheet size, a set margin, and a number of divisions of the object to be imaged;
        correct the plurality of divided images by using the sheet information on the object to be imaged; and
        generate one composite image by compositing the plurality of divided images after being corrected.

2. The imaging device according to claim 1,
    wherein the processor detects boundaries between the plurality of areas by performing edge detection on the plurality of divided images, and
    the processor composites the plurality of divided images by combining the detected boundaries.

3. The imaging device according to claim 2,
    wherein the processor corrects each of the plurality of divided images to target size and shape.

4. The imaging device according to claim 2,
    wherein the processor corrects a size, distortion, and inclination of each of the plurality of divided images.

5. The imaging device according to claim 1,
    wherein the processor corrects each of the plurality of divided images to target size and shape.

6. The imaging device according to claim 1,
    wherein the processor corrects a size, distortion, and inclination of each of the plurality of divided images.

7. The imaging device according to claim 1,
wherein a periphery of the object to be imaged is provided with a margin, and
the processor corrects a portion, other than the margin, of each of the plurality of divided images to a size which is obtained by dividing the sheet size included in the sheet information by the number of divisions and subtracting the set margin from a quotient.

8. The imaging device according to claim 1, further comprising
a display that displays which area of the object to be imaged is captured in which direction.

9. The imaging device according to claim 8,
wherein the display displays an image of the object to be imaged captured by the camera, and target positions of four corners of a target area to be imaged of the object to be imaged, and
when the target positions match the positions of the four corners of the target area to be imaged within a predetermined range in the image displayed by the display, the camera images the target area to be imaged.

10. A non-transitory computer readable medium storing a program causing a computer configurating an imaging device to execute a process comprising:
dividing an object to be imaged into a plurality of areas, and capturing a plurality of divided images;
obtaining sheet information on the object to be imaged, wherein the sheet information includes a sheet size, a set margin, and a number of divisions of the object to be imaged;
correcting the plurality of divided images by using the sheet information on the object to be imaged; and
generating one composite image by compositing the plurality of divided images after being corrected.

* * * * *